US010394504B2

(12) United States Patent
Yamaguchi

(10) Patent No.: US 10,394,504 B2
(45) Date of Patent: Aug. 27, 2019

(54) IMAGE FORMING SYSTEM, IMAGE FORMING APPARATUS, AND NON-TRANSITORY COMPUTER-READABLE STORAGE MEDIUM STORING PROGRAM FOR INFORMATION PROCESSING APPARATUS

(71) Applicant: Konica Minolta, Inc., Tokyo (JP)

(72) Inventor: Shotaro Yamaguchi, Kokubunji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/435,888

(22) Filed: Feb. 17, 2017

(65) Prior Publication Data

US 2017/0242640 A1 Aug. 24, 2017

(30) Foreign Application Priority Data

Feb. 19, 2016 (JP) ................................ 2016-030074

(51) Int. Cl.
*G06F 3/12* (2006.01)
*G06K 15/00* (2006.01)

(52) U.S. Cl.
CPC .......... *G06F 3/1263* (2013.01); *G06F 3/1215* (2013.01); *G06F 3/1217* (2013.01); *G06F 3/1229* (2013.01); *G06F 3/1264* (2013.01); *G06F 3/1288* (2013.01); *G06F 3/1296* (2013.01); *G06K 15/4025* (2013.01)

(58) Field of Classification Search
None
See application file for complete search history.

(56) References Cited

U.S. PATENT DOCUMENTS

| | | | | |
|---|---|---|---|---|
| 2010/0194026 A1* | 8/2010 | Iguchi | ...................... | B65H 7/12 271/3.15 |
| 2011/0063657 A1* | 3/2011 | Okada | ................ | G03G 15/5012 358/1.15 |
| 2016/0274840 A1* | 9/2016 | Bannai | .................. | G06F 3/1238 |
| 2016/0299731 A1* | 10/2016 | Kayama | ................ | G06F 3/1263 |

FOREIGN PATENT DOCUMENTS

| | | |
|---|---|---|
| JP | 2006227795 A * | 8/2006 |
| JP | 2006-321583 | 11/2006 |
| JP | 2011-079250 | 4/2011 |
| JP | 2013-092999 | 5/2013 |

* cited by examiner

*Primary Examiner* — Huo Long Chen

(57) ABSTRACT

A post processing apparatus is used effectively, an execution waiting time of a print job due to moving of a self-travelling post processing apparatus is shortened, and a total printing time is shortened, whereby productivity is increased. In an image forming system which includes a self-travelling post processing apparatus being separably connected to an image forming apparatus, when receiving a plurality of print jobs including both a print job which performs the post processing by the post processing apparatus and a print job which does not perform post processing, an execution order of the plurality of print jobs is changed in accordance with a connecting state of the post processing apparatus to the image forming apparatus.

11 Claims, 13 Drawing Sheets

FIG.7A

RECEIVED PRINT JOB(S101)

| EXECUTION ORDER | JOB NO. | POST PROCESSING | PRIORITY |
|---|---|---|---|
| 1 | PRINT JOB 1 | NO | - |
| 2 | PRINT JOB 2 | YES | - |

FIG.7B

SETTING PRIORITY
(S104: PRIORITY OF PRINT JOB BEING SET POST PROCESSING TO "HIGH")

| EXECUTION ORDER | JOB NO. | POST PROCESSING | PRIORITY |
|---|---|---|---|
| 1 | PRINT JOB 1 | NO | LOW |
| 2 | PRINT JOB 2 | YES | HIGH |

FIG.7C

PROCESSING FOR CHANGING EXECUTION ORDER OF PRINT JOBS (S110)

| EXECUTION ORDER | JOB NO. | POST PROCESSING | PRIORITY |
|---|---|---|---|
| 1 | PRINT JOB 2 | YES | HIGH |
| 2 | PRINT JOB 1 | NO | LOW |

FIG.8A

RECEIVED PRINT JOB(S101)

| EXECUTION ORDER | JOB NO. | POST PROCESSING | PRIORITY |
|---|---|---|---|
| 1 | PRINT JOB 1 | YES | - |
| 2 | PRINT JOB 2 | NO | - |

FIG.8B

SETTING PRIORITY
(S105: PRIORITY OF PRINT JOB NOT BEING SET POST PROCESSING TO "HIGH")

| EXECUTION ORDER | JOB NO. | POST PROCESSING | PRIORITY |
|---|---|---|---|
| 1 | PRINT JOB 1 | YES | LOW |
| 2 | PRINT JOB 2 | NO | HIGH |

FIG.8C

PROCESSING FOR CHANGING EXECUTION ORDER OF PRINT JOBS (S110)

| EXECUTION ORDER | JOB NO. | POST PROCESSING | PRIORITY |
|---|---|---|---|
| 1 | PRINT JOB 2 | NO | HIGH |
| 2 | PRINT JOB 1 | YES | LOW |

FIG.10A RECEIVED PRINT JOB(S101)

| EXECUTION ORDER | JOB NO. | POST PROCESSING | PRIORITY | STATUS |
|---|---|---|---|---|
| 1 | PRINT JOB 1 | YES | - | WAIT |
| 2 | PRINT JOB 2 | NO | - | WAIT |
| 3 | PRINT JOB 3 | NO | - | WAIT |

FIG.10B SETTING PRIORITY (S105: PRIORITY OF PRINT JOB NOT BEING SET POST PROCESSING TO "HIGH")

| EXECUTION ORDER | JOB NO. | POST PROCESSING | PRIORITY | STATUS |
|---|---|---|---|---|
| 1 | PRINT JOB 1 | YES | LOW | WAIT |
| 2 | PRINT JOB 2 | NO | HIGH | WAIT |
| 3 | PRINT JOB 3 | NO | HIGH | WAIT |

FIG.10C PROCESSING FOR CHANGING EXECUTION ORDER OF PRINT JOBS (S110)

| EXECUTION ORDER | JOB NO. | POST PROCESSING | PRIORITY | STATUS |
|---|---|---|---|---|
| 1 | PRINT JOB 2 | NO | HIGH | WAIT |
| 2 | PRINT JOB 3 | NO | HIGH | WAIT |
| 3 | PRINT JOB 1 | YES | LOW | WAIT |

FIG.10D EXECUTING PRINT JOB (S112 TO S202)

| EXECUTION ORDER | JOB NO. | POST PROCESSING | PRIORITY | STATUS |
|---|---|---|---|---|
| 1 | PRINT JOB 2 | NO | HIGH | COMPLETION |
| 2 | PRINT JOB 3 | NO | HIGH | WAIT |
| 3 | PRINT JOB 1 | YES | LOW | WAIT |

FIG.10E SETTING PRIORITY (S202: PRIORITY OF PRINT JOB BEING SET POST PROCESSING TO "HIGH")

| EXECUTION ORDER | JOB NO. | POST PROCESSING | PRIORITY | STATUS |
|---|---|---|---|---|
| 1 | PRINT JOB 2 | NO | HIGH | COMPLETION |
| 2 | PRINT JOB 3 | NO | LOW | WAIT |
| 3 | PRINT JOB 1 | YES | HIGH | WAIT |

FIG.10F PROCESSING FOR CHANGING EXECUTION ORDER OF PRINT JOBS (S203)

| EXECUTION ORDER | JOB NO. | POST PROCESSING | PRIORITY | STATUS |
|---|---|---|---|---|
| 1 | PRINT JOB 2 | NO | HIGH | COMPLETION |
| 2 | PRINT JOB 1 | YES | HIGH | WAIT |
| 3 | PRINT JOB 3 | NO | LOW | WAIT |

FIG.13A

RECEIVED PRINT JOB(S301)

| EXECUTION ORDER | JOB NO. | POST PROCESSING | PRIORITY |
|---|---|---|---|
| 1 | PRINT JOB 1 | POST PROCESSING 2 | - |
| 2 | PRINT JOB 2 | POST PROCESSING 1 | - |

FIG.13B

SETTING PRIORITY
(S304: PRIORITY OF PRINT JOB WITH POST PROCESSING 1 TO "HIGH")

| EXECUTION ORDER | JOB NO. | POST PROCESSING | PRIORITY |
|---|---|---|---|
| 1 | PRINT JOB 1 | POST PROCESSING 2 | LOW |
| 2 | PRINT JOB 2 | POST PROCESSING 1 | HIGH |

FIG.13C

PROCESSING FOR CHANGING EXECUTION ORDER OF PRINT JOBS (S310)

| EXECUTION ORDER | JOB NO. | POST PROCESSING | PRIORITY |
|---|---|---|---|
| 1 | PRINT JOB 2 | POST PROCESSING 1 | HIGH |
| 2 | PRINT JOB 1 | POST PROCESSING 2 | LOW |

FIG.14A

RECEIVED PRINT JOB(S301)

| EXECUTION ORDER | JOB NO. | POST PROCESSING | PRIORITY |
|---|---|---|---|
| 1 | PRINT JOB 1 | POST PROCESSING 2 | - |
| 2 | PRINT JOB 2 | POST PROCESSING 1 | - |
| 3 | PRINT JOB 3 | NO | - |

FIG.14B

SETTING PRIORITY
(S306: PRIORITY OF PRINT JOB NOT BEING SET POST PROCESSING TO "HIGH")

| EXECUTION ORDER | JOB NO. | POST PROCESSING | PRIORITY |
|---|---|---|---|
| 1 | PRINT JOB 1 | POST PROCESSING 2 | LOW |
| 2 | PRINT JOB 2 | POST PROCESSING 1 | LOW |
| 3 | PRINT JOB 3 | NO | HIGH |

FIG.14C

PROCESSING FOR CHANGING EXECUTION ORDER OF PRINT JOBS (S310)

| EXECUTION ORDER | JOB NO. | POST PROCESSING | PRIORITY |
|---|---|---|---|
| 1 | PRINT JOB 3 | NO | HIGH |
| 2 | PRINT JOB 1 | POST PROCESSING 2 | LOW |
| 3 | PRINT JOB 2 | POST PROCESSING 1 | LOW |

IMAGE FORMING SYSTEM, IMAGE FORMING APPARATUS, AND NON-TRANSITORY COMPUTER-READABLE STORAGE MEDIUM STORING PROGRAM FOR INFORMATION PROCESSING APPARATUS

CROSS-REFERENCE TO RELATED APPLICATION

This U.S. patent application is entitled to and claims the benefit of Japanese Patent Application No. 2016-30074, filed on Feb. 19, 2016, the entire contents of which are incorporated herein by reference.

BACKGROUND

Technical Field

The present invention relates to an image forming system, an image forming apparatus, and a non-transitory computer-readable storage medium storing a program for an information processing apparatus.

Description of Related Arts

An image forming apparatus may be connected to a post processing apparatus which performs post processing, such as binding processing and punching processing, for sheets on which images have been formed. Then, a post processing apparatus to be combined may be selected in accordance with the kind of required post processing, or a plurality of post processing apparatuses may be linked to a single image forming apparatus.

Under the environment where a plurality of image forming apparatuses are used in a single office, in the case where post processing is required to be performed at each of the plurality of image forming apparatuses, it is necessary to prepare a post processing apparatus for each of all the image forming apparatuses.

Japanese Unexamined Patent Publication No. 2006-321583 discloses a self-traveling finisher equipped with a traveling device capable of self-traveling. Upon receipt of a printing and delivery instruction from a user via a PC (personal computer), the self-traveling finisher receives printed sheets sent out from an image forming apparatus connected to the finisher. Then, the finisher separates from the image forming apparatus while holding the printed sheets therein, self-travels, moves up to the PC of the user, and delivers the printed sheets to the user.

In an office where a plurality of image forming apparatuses are used, if a post processing apparatus is prepared for each of all the image forming apparatuses, it becomes possible to execute post processing at each of the image forming apparatuses. However, this arrangement becomes comparatively high in cost.

It may be considered to reconnect a single post processing apparatus to an image forming apparatus which executes a print job in accordance with the print job to use the post processing apparatus. However, it is not realistic to reconnect the post processing apparatus for each of the print jobs by hand of people.

With regard to the self-traveling finisher disclosed by the above Japanese Unexamined Patent Publication, while the self-traveling finisher is delivering the printed sheets to the user, naturally, the image forming apparatus cannot execute a print job required to use the self-traveling finisher.

The present invention has been achieved in view of the above-mentioned situations, and the objects of the present invention is to reduce the number of post processing apparatuses required as a whole so as to use a post processing apparatus effectively, to shorten an execution waiting time due to the moving of a self-traveling post processing apparatus, and to shorten the total printing time so as to increase productivity.

SUMMARY

To achieve at least one of the abovementioned objects, an image forming system reflecting one aspect of the present invention, comprises an image forming apparatus which includes an image forming section to perform image formation for a sheet based on print data of a print job and a communication section; a self-travelling post processing apparatus which is separably connected to the image forming apparatus and includes a post processing section to perform post processing for a sheet conveyed from the image forming apparatus, a travelling section to move the post processing apparatus itself, and a communication section to communicate with the image forming apparatus; and a processor configured such that when receiving a plurality of print jobs which are executed by the image forming apparatus and include both a print job which performs the post processing by the post processing apparatus and a print job which does not perform the post processing, the processor changes an execution order of the plurality of print jobs in accordance with a connecting state of the post processing apparatus to the image forming apparatus.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 7A is a diagram showing the changing procedures of a printing order.

FIG. 7B is a diagram showing the changing procedures of a printing order.

FIG. 7C is a diagram showing the changing procedures of a printing order.

FIG. 8A is a diagram showing the changing procedures of a printing order.

FIG. 8B is a diagram showing the changing procedures of a printing order.

FIG. 8C is a diagram showing the changing procedures of a printing order.

FIG. 10A is a diagram showing the changing procedures of a printing order.

FIG. 10B is a diagram showing the changing procedures of a printing order.

FIG. 10C is a diagram showing the changing procedures of a printing order.

FIG. 10D is a diagram showing the changing procedures of a printing order.

FIG. 10E is a diagram showing the changing procedures of a printing order.

FIG. 10F is a diagram showing the changing procedures of a printing order.

FIG. 13A is a diagram showing the changing procedures of a printing order.

FIG. 13B is a diagram showing the changing procedures of a printing order.

FIG. 13C is a diagram showing the changing procedures of a printing order.

FIG. 14A is a diagram showing the changing procedures of a printing order.

FIG. 14B is a diagram showing the changing procedures of a printing order.

FIG. 14C is a diagram showing the changing procedures of a printing order.

DETAILED DESCRIPTION

Figure 1:
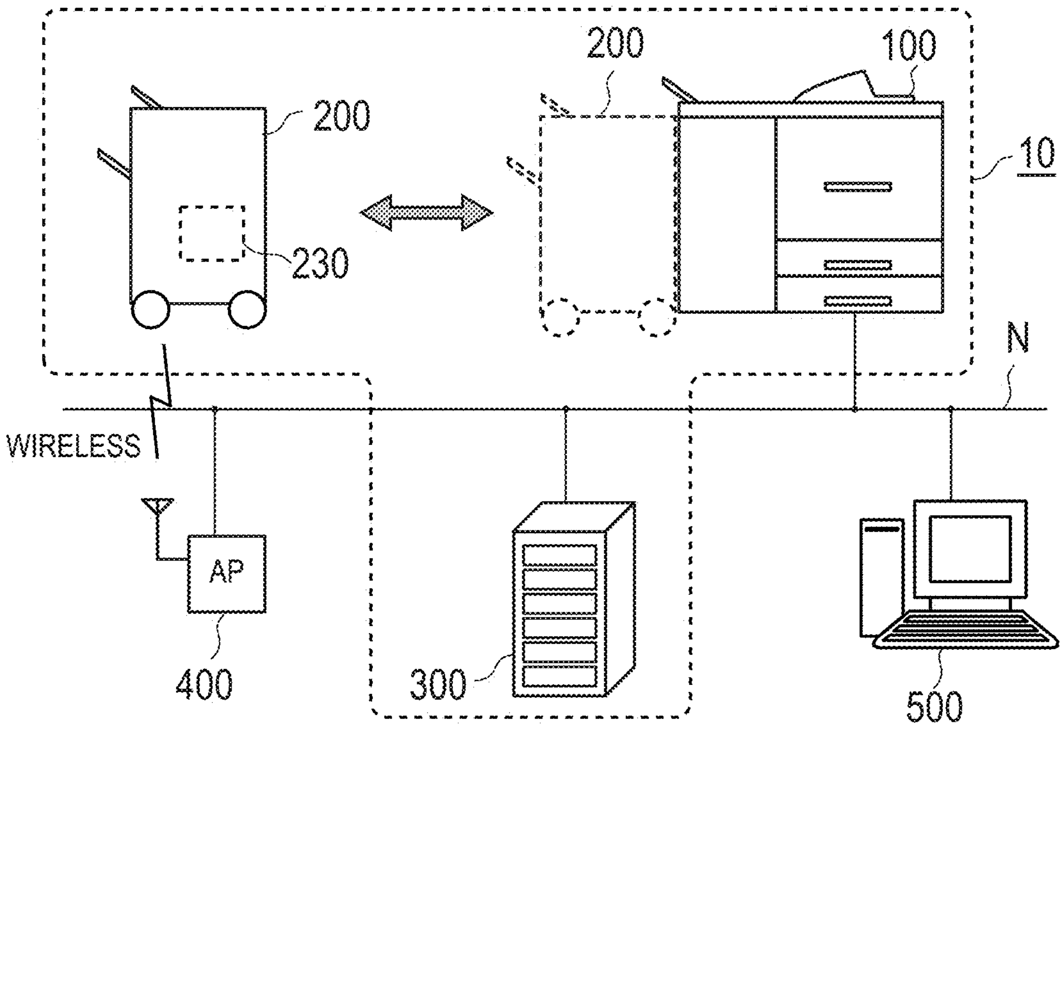
FIG. 1 is a drawing showing an entire constitution of an image forming system according to the first embodiment.

Hereinafter, an embodiment of the present invention will be described with reference to the attached drawings. In the description of the drawings, the same sign is given to the same element, and the overlapping description is omitted. Since a dimension ratio in the drawings is exaggerated on account of description, the ratio may be different from the actual ratio.

(First Embodiment)

Figure 2:
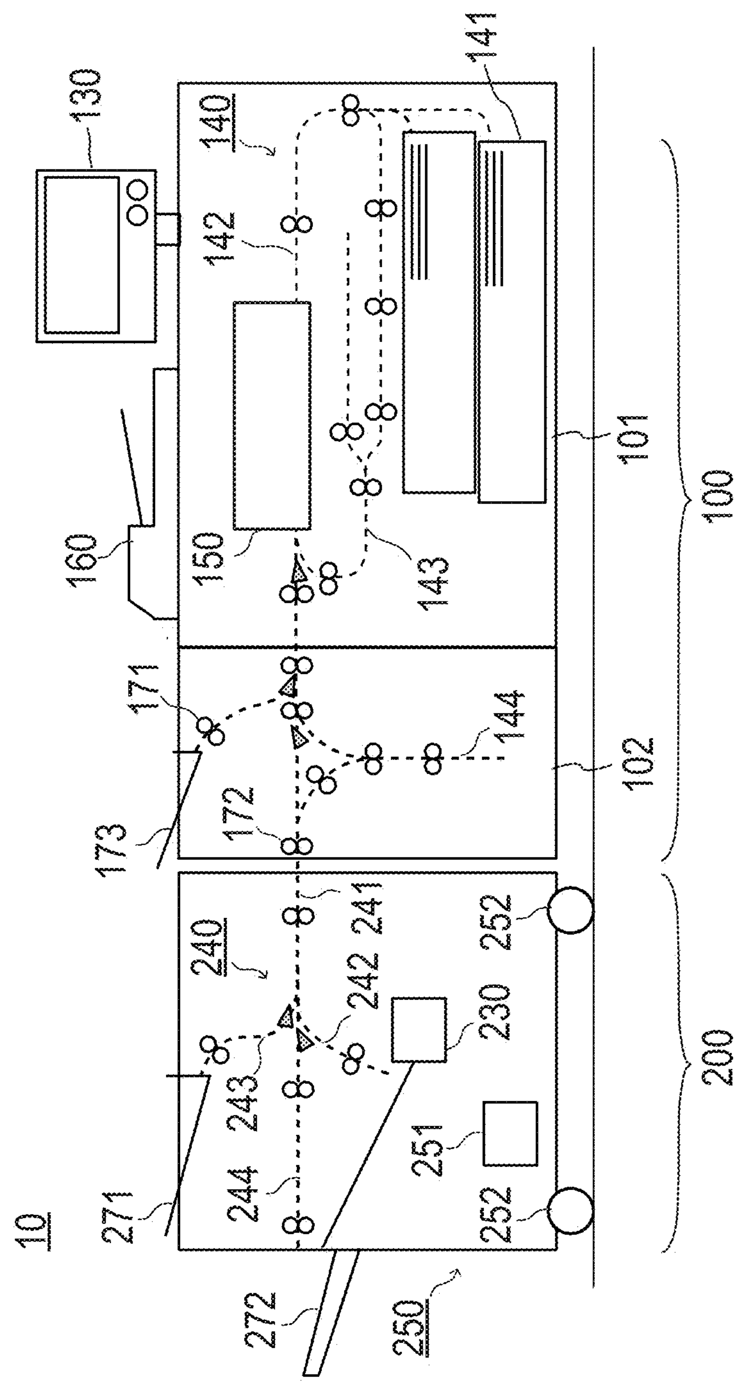
FIG. 2 is a drawing showing a cross sectional view of a main constitution of the image forming system.
Figure 3:
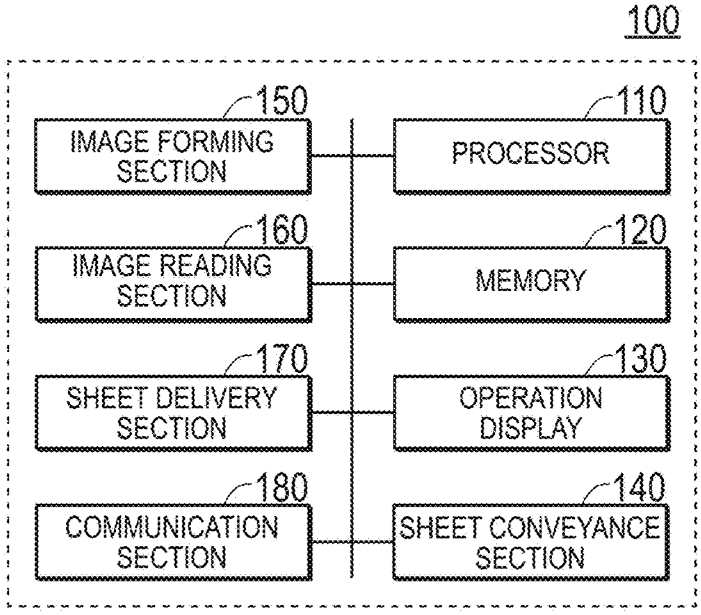
FIG. 3 is a block diagram showing a hardware constitution of an image forming apparatus.
Figure 4:
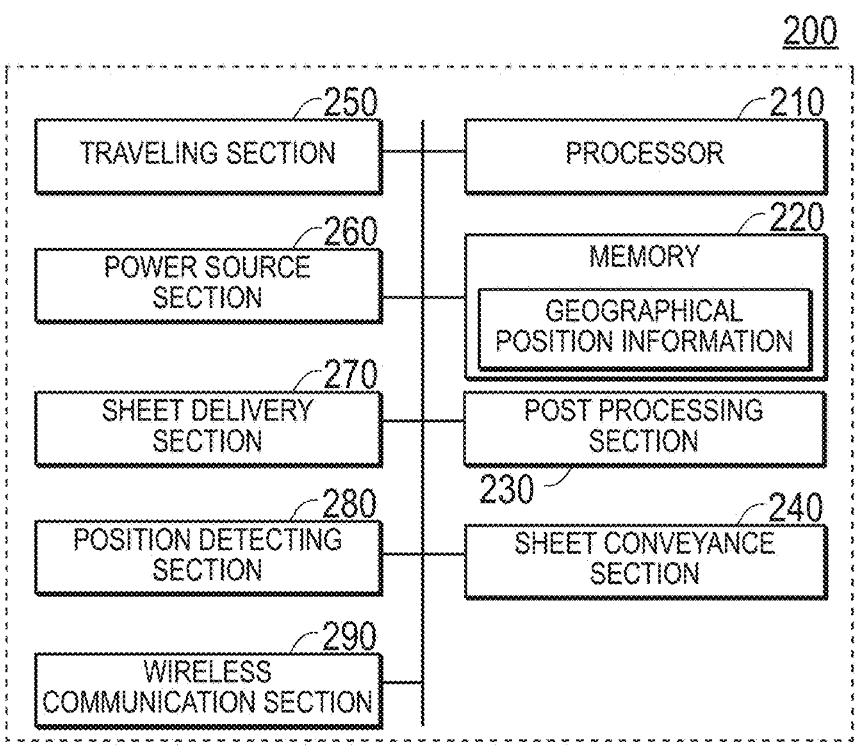
FIG. 4 is a block diagram showing a hardware constitution of a post processing apparatus.
Figure 5:
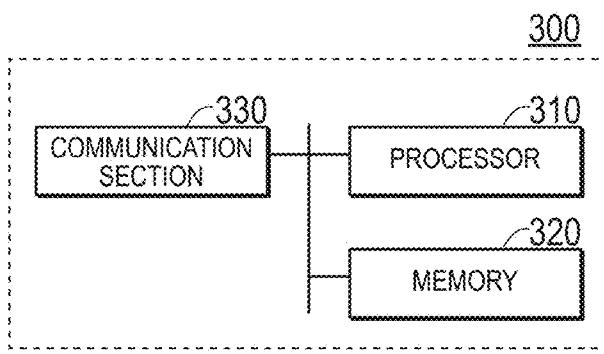
FIG. 5 is a block diagram showing a hardware constitution of a server.

FIG. 1 to FIG. 5 each is a drawing showing an example of a constitution of an image forming system 10 according to the present embodiment. FIG. 1 is a drawing showing the entire constitution of the image forming system 10 which includes an image forming apparatus 100, a post processing apparatus 200, and a server 300. FIG. 2 is a drawing showing a cross sectional view of the main constitution of the image forming system 10. FIG. 3 to FIG. 5 are block diagrams showing the respective hardware constitutions of the image forming apparatus 100, the post processing apparatus 200, and the server 300.

(Image Forming System 10)

(1) Entire Constitution

As shown in FIG. 1 and FIG. 2, the image forming system 10 includes the image forming apparatus 100, the post processing apparatus 200, and the server 300. The post processing apparatus 200 is a self-traveling post processing apparatus which is (mechanically) separably connected to the image forming apparatus 100, and at the time of being connected to the image forming apparatus 100, the post processing apparatus 200 performs post processing for sheets which have been subjected to image formation and are conveyed from the image forming apparatus 100. The image forming apparatus 100, the server 300, an access point 400, and a user terminal 500 are electrically connected to a network N using a standard such as Ethernet (registered trademark) via cables or wirelessly so as to be able to communicate. The post processing apparatus 200, the image forming apparatus 100, and the server 300 can communicate with each other via the access point 400 with wireless communication. Examples of the user terminal 500 includes a PC (personal computer) which sends data for printing and a print job for a pull print to the server 300 and sends a print job to the image forming apparatus 100.

(2) Image Forming Apparatus 100

As shown in FIG. 1 to FIG. 3, the image forming apparatus 100 is constituted by a main body 101 and an inversion conveyor unit 102. The image forming apparatus 100 includes a processor 110, a memory 120, an operation display 130, a sheet conveyance section 140, an image forming section 150, an image reading section 160, a sheet delivery section 170, and a communication section 180, and these components are connected to each other with signal lines.

The processor 110 includes a CPU, a RAM, and a ROM, and reads out various kinds of programs stored in the ROM or the memory 120 appropriately and develops the programs into the RAM. Successively, the CPU executes the programs, thereby realizing various functions.

The memory 120 includes an HDD (hard disk drive), and stores various kinds of programs, image data for printing, and the like.

The operation display 130 includes, for example, a touch panel in which a touch sensor is superimposed on a liquid crystal display, displays a state of the image forming apparatus 100 for a user, and receives a print instruction from a user.

The sheet conveyance section 140 includes a plurality of sheet feed trays 141 to accommodate sheets, a sheet conveyance passage 142, a double-sided image formation conveyance passage 143, an inversion conveyance passage 144, a plurality of conveyance roller pairs, and a drive motor (not shown), and conveys sheets fed one sheet by one sheet from the sheet feed tray 141 to each section in the apparatus.

The image forming section 150 is, for example, an image forming section of an electrophotographying type, and includes a photoconductor drum, an electrification electrode, an exposure section, a developing section, a transfer section, a cleaning section, a fixing section, and so on. An electrostatic latent image formed on the photoconductor drum is developed by the developing section into a toner image. The toner image is transferred and fixed with heat on a sheet conveyed by the sheet conveyance section 140 so that an image is formed on the sheet.

The image reading section 160 is disposed on an upper part of the main body 101 of the image forming apparatus 100, includes an optical system having mirrors, lenses, etc., and a reading sensor such as a CCD, reads out a document placed on a platen glass or a document conveyed by an ADF, and outputs image signals.

The sheet delivery section 170 includes a first sheet delivery section 171, a second sheet delivery section 172, a sheet delivery tray 173, and so on. In the case where the post processing apparatus 200 is not connected, or in the case where post processing is not performed by the post processing apparatus 200, sheets are delivered to the outside of the apparatus via the first sheet delivery section 171, and stacked on the sheet delivery tray 173. In the case where post processing is performed by the connected post processing apparatus 200, sheets are conveyed via the second sheet delivery section 172 to the post processing apparatus 200 located at a downstream side.

The communication section 180 is an interface to communicate with each apparatus via the network N. The communication section 180 may also have a wireless communication function by wireless communication standards such as Bluetooth (registered trademark), IEEE802.11, Home RF, IrDA, and may be constituted so as to communicate with the post processing apparatus 200 directly.

(3) Post Processing Apparatus 200

As shown in FIG. 1, FIG. 2, and FIG. 4, the post processing apparatus 200 includes a processor 210, a memory 220, a post processing section 230, a sheet conveyance section 240, a traveling section 250, a power source section 260, a sheet delivery section 270, a position detecting section 280, and a wireless communication section 290, and these components are connected to each other with signal lines.

The processor 210 includes a CPU, a RAM, and a ROM, and reads out various kinds of programs stored in the ROM or the memory 220 appropriately, and develops the programs into the RAM. Successively, the CPU executes the programs, thereby realizing various functions.

The memory 220 includes an HDD, and stores various kinds of programs and geographical position information. The geographical position information is information regarding an arrangement of the image forming apparatus 100 and the other image forming apparatuses which are set to be able to be connected to the post processing apparatus 200 and located in the same office. Examples of the geographical position information include an arrangement diagram of respective image forming apparatuses in an office and information which shows the distance and direction of each of courses to connect these apparatuses.

The post processing section 230 performs side stitching processing as post processing. Sheets conveyed from the image forming apparatus 100 are placed on a placing stand. After the predetermined number of sheets are placed, a bundle of placed sheets is subjected to matching processing. Thereafter, the bundle of sheets are stapled at positions located away by a predetermined distance from the edge of the bundle of sheets, whereby the bundle of sheets is subjected to side stitching so as to form a booklet. Herein, the post processing is not limited to the side stitching. It may be possible to use a post processing section which performs the other post processing, such as saddle stitching processing and punching processing.

The sheet conveyance section 240 includes the first to fourth conveyance passages 241, 242, 243, and 244, a plurality of conveyance roller pairs, and a drive motor (not shown), and conveys sheets conveyed from the second sheet delivery section 172 of the image forming apparatus 100 to each section in the apparatus.

The traveling section 250 includes a drive motor 251 and a plurality of wheels 252 which are driven by the drive motor 251 to rotate at right and left sides separately independently and in normal and reverse directions. The post processing apparatus 200 itself self-travels with the traveling section 250.

When the post processing apparatus 200 is connected to the image forming apparatus 100, the power source section 260 supplies electric power to the whole portion of the post processing apparatus 200 from commercial power source via the image forming apparatus 100. Further, the power source section 260 includes a battery constituted by rechargeable lithium-ion batteries etc. When the post processing apparatus 200 is not connected to the image forming apparatus 100, the battery supplies electric power to the processor 210, traveling section 250, and so on. While the post processing apparatus 200 is being connected to the image forming apparatus 100, the battery is charged with electric power from the commercial power source supplied from the image forming apparatus 100.

The sheet delivery section 270 includes a first sheet delivery tray 271 and a second sheet delivery tray 272. Sheets which are not subjected to post processing are delivered onto the first sheet delivery tray 271 via the third conveyance passage 243. Sheets having been applied with post processing by the post processing section 230, or sheets conveyed via the fourth conveyance passage 244 are delivered onto the second sheet delivery tray 272.

The position detecting section 280 detects the geographical position of the post processing apparatus 200 and the connecting state of the post processing apparatus 200 to the image forming apparatus 100. With regard to the geographical position, the position detecting section 280 grasps the position of the post processing apparatus itself successively by calculating a moving direction and an amount of movement based on an amount of rotation of each of the wheels 252 while the post processing apparatus 200 is moving. Further, the position detecting section 280 includes a camera. The processor 210 recognizes the appearance of the image forming apparatus 100 from an image by a camera, performs positioning between the second sheet delivery section 172 of the image forming apparatus 100 and the first conveyance passage 241 of the post processing apparatus 200, and connects both the apparatuses. Further, the position detecting section 280 detects a state where the connection of the post processing apparatus 200 to the image forming apparatus 100 has been completed electrically and mechanically, and outputs a connection completion status to the processor 210. Hereinafter, a state of being connected to an image forming apparatus electrically and mechanically is also merely referred to "having been connected", and a state of not being connected is also merely referred to "being not connected". The processor 210 transmits having become "having been connected" to the image forming apparatus 100 and the server 300. In a state of "having been connected", communication with regard to control timing of sheets between the image forming apparatus 100 and the post processing apparatus 200 can be performed via signal lines with a cable by an unillustrated communication section.

The wireless communication section 290 wirelessly communicates with the access point 400 etc. connected to the network N by standards such as Bluetooth and IEEE802.11.

(4) Server 300

As shown in FIG. 1 and FIG. 5, the server 300 as an information processing apparatus includes a processor 310, a memory 320, and a communication section 330, and these components are connected to each other with signal lines. Since these constituting sections are equipped with hardware constitutions equivalent to the respective constituting sections of the image forming apparatus 100, descriptions for them are omitted.

The server 300 also functions as a pull print server, and executes a pull print. The pull print is a function configured to correlate one or more print jobs received from the user terminal 500 with a user ID, to store them in the memory 320, and to transmit one or more print jobs selected by an instruction of a user through the operation display 130 of the image forming apparatus 100 to the image forming apparatus 100. The server 300 may transmit one or more selected print jobs to a predetermined image forming apparatus 100 without depending on an instruction of a user.

In the above image forming system 10, the self-traveling post processing apparatus 200 is not always connected to the image forming apparatus 100, and can be connected to the other image forming apparatus. In the case where post processing is executed by any one of the other image forming apparatus and the image forming apparatus 100 of the image forming system 10, the post processing apparatus 200 moves up to the counter party, and then executes a print job. By using such a self-traveling post processing apparatus 200, without preparing post processing apparatuses corresponding in number to all the image forming apparatuses, a print job which performs post processing in all the image forming apparatuses can be performed with a small number of post processing apparatuses. Further, by sharing a single post processing apparatus among a plurality of image forming apparatuses, the operation ratio of the post processing apparatus is increased, and the post processing apparatus can be used efficiently.

Even in a state where the post processing apparatus 200 is "being not connected", the image forming apparatus 100 can receive a print job which performs the post processing of this post processing apparatus 200. In the case of receiving such a print job, the image forming apparatus 100 or the server 300 transmits "a connection request" to the post processing apparatus 200. Based on this connection request, the post processing apparatus 200 moves up to the image forming apparatus 100 of a source of the connection request, and executes post processing.

Hereinafter, even if such the image forming system 10 receives a print job, in the case where the post processing apparatus 200 is not connected, post processing may be unable to be performed immediately. In such a case, in the present embodiment, the execution order of a plurality of print jobs is changed in accordance with the connecting state of the post processing apparatus 200, whereby the total printing time of the plurality of print jobs is shortened, and productivity is increased. Hereinafter, with reference to FIG. 6 to FIG. 8, the printing control according to the present embodiment will be described.

(Printing Control)

Figure 6:
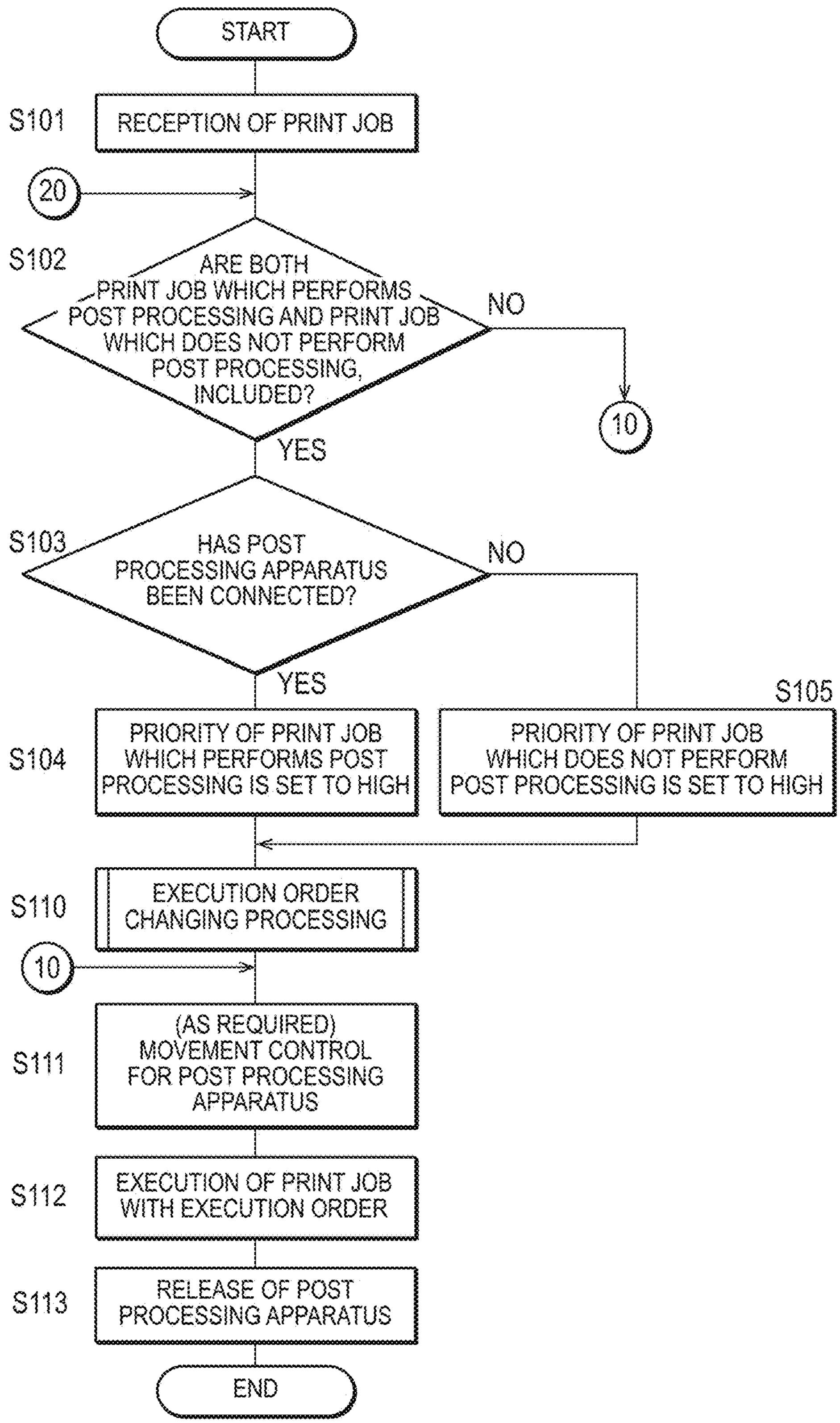
FIG. 6 is a flow chart which shows printing control executed by a processor of a server.

FIG. 6 is a flowchart showing printing control mainly executed by the processor 310 of the server 300, and FIGS. 7A, 7B, and 7C, and FIGS. 8A, 8B, and 8C are diagrams showing the changing procedures of the printing order among a plurality of print jobs.

In the case where the processor 310 receives a print job execution instruction by the image forming apparatus 100 from a user via the user terminal 500 or the operation display 130 at the beginning (S101), the processor 310 determines whether this print job is a plurality of print jobs which include both a print job which performs post processing and a print job which does not perform post processing (S102).

With regard to the reception of a print job, the server 300 may receive the print job like a pull print, and may transmit the print job to the image forming apparatus 100. Alternatively, the image forming apparatus 100 may receive directly a print job, and may transmit the print job to the server 300 in accordance with an acquisition request of the print job from the server 300, or automatically. Hereinafter, in either case, the print job is described as a print job received by the image forming apparatus 100. The plurality of print jobs may be received at one time like a pull print, or may be received sequentially. In the latter case, at each time when a new print job is received, the new print job is stacked at the back of an execution queue, and the processing after Step S101 is executed.

In the case where the processor 310 has determined such that both a print job which performs post processing and a print job which does not perform post processing are included (S102: YES), the processor 310 determines whether the post processing apparatus 200 has been connected to the image forming apparatus 100 which has received the print job. In the case where the post processing apparatus 200 has been connected to the image forming apparatus 100 (S103: YES), the processor 310 sets the priority of the print job which performs post processing, to "high" among the plurality of print jobs (S104). Successively, at the following Step S110, the processor 310 changes the execution order of the plurality of print jobs such that the print job with a high priority is executed first. Hereinafter, this execution order changing processing will be described with reference to a specific example.

FIGS. 7A, 7B, and 7C show an example of print jobs in such a case. FIG. 7A shows print jobs received at Step S101, and the plurality of received print jobs include both a print job 2 which performs post processing and a print job 1 which does not perform post processing, and a predetermined printing order is attached by an instruction of a user and the like.

Since the post processing apparatus has been connected, as shown in FIG. 7B, the priority of the print job 2 which performs post processing, is set to "high", and the priority of the print job 1 which does not perform post processing is set to "low" lower than that of the print job 2. Then, as shown in FIG. 7C, based on the set priorities, the execution order of the plurality of print jobs is changed such that the print job 2 with a high priority is executed earlier than the print job 1 with a priority lower than that of the print job 2.

On the other hand, in the case where the post processing apparatus 200 is not connected to the image forming apparatus 100 which has received the print job (S103: NO), the priority of the print job which does not perform post processing, is set to "high" among the plurality of print jobs (S105). Then, at the next step S110, the execution order of the plurality of print jobs is changed such that a print job with a high priority is executed first.

FIGS. 8A, 8B, and 8C show an example of print jobs in such a case. FIG. 8A shows print jobs received at Step S101, and the plurality of received print jobs include both a print job 1 which performs post processing and a print job 2 which does not perform post processing.

Since the post processing apparatus is not connected, as shown in FIG. 8B, the priority of the print job 2 which does not perform post processing, is set to "high", and the priority of the print job 1 which performs post processing, is set to "low" lower than that of the print job 2. Then, as shown in FIG. 8C, based on the set priorities, the execution order of the plurality of print jobs is changed such that the print job 2 with a high priority is executed earlier than the print job 1 with a priority lower than that of the print job 2.

In Step S111, if the post processing apparatus 200 is not connected, the movement control of the post processing apparatus 200 is performed. In concrete terms, the processor 310 notifies "a connection request" by the wireless communication through the access point 400 to the processor 210 of the post processing apparatus 200. The post processing apparatus 200 moves towards the designated image forming apparatus 100 in response to the connection request, and is connected to the image forming apparatus 100.

Under the control of the processor 310, the image forming apparatus 100 executes the plurality of print jobs sequentially in the execution order changed at Step S110, and performs image formation for sheets. With regard to the print job which performs post processing, the sheets subjected to the image formation are conveyed from the second sheet delivery section 172 toward the post processing apparatus 200. The post processing apparatus 200 which has received the sheets performs post processing in the post processing section 230, and delivers the sheets to the second sheet delivery tray 272 (S112).

After the print job which performs post processing has been completed, the image forming apparatus 100 releases the post processing apparatus 200, and the processing has been completed (S113, END). With this release, a flag of being not used stands for the post processing apparatus 200, and then, it becomes possible to use the post processing apparatus 200 for the other image forming apparatuses 100.

In this way, according to the image forming system 10 of the present embodiment, the number of post processing apparatuses required as a whole can be reduced by using the self-traveling post processing apparatus which can perform post processing. Further, when a print job is received, in the case where the post processing apparatus is not connected to the image forming apparatus, a print job which does not perform post processing, is executed first. By doing in such a way, since moving processing of the post processing apparatus and execution processing of the print job can be run in parallel, the total printing time for the plurality of print jobs is shortened, and productivity can be increased. Furthermore, when a print job is received, in the case where the post processing apparatus has been connected to the image forming apparatus, a print job which performs post processing, is executed first. Accordingly, the shared post processing apparatus is released at an early stage, and it becomes possible to use the post processing apparatus for the other image forming apparatuses, whereby the post processing apparatus can be used effectively.

The processing with regard to the connecting and releasing (separating) of the post processing apparatus 200 at Steps S111 and S113 may be performed during the execution of Step S112 or before or after Step S112 if possible in terms of the relationship with a print job being processed. For example, while a print job which does not perform post processing successively is being executed immediately after a print job which performs post processing has been completed, the post processing apparatus 200 is released away.

(Modification Example)

Figure 9:
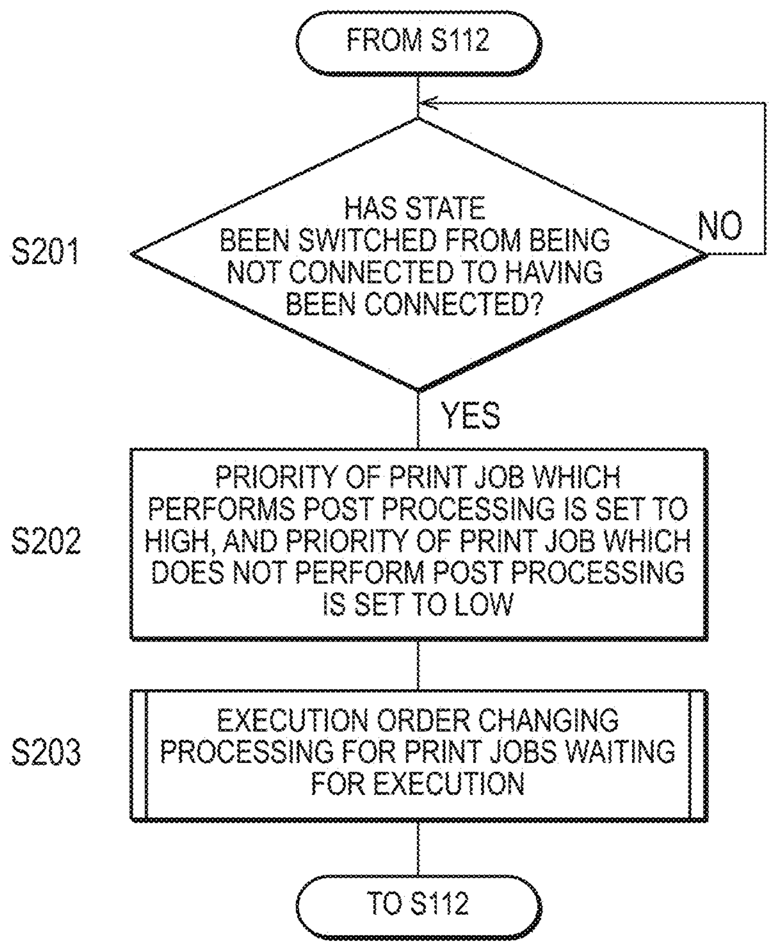
FIG. 9 is a flow chart showing printing control executed by a processor of a server according to a modification example.

FIG. 9 is a flow chart showing printing control executed by the processor 310 in a modification example, and FIGS. 10A to 10F. are diagrams showing changing procedures of a printing order among a plurality of print jobs. This modification example intends to release the post processing apparatus 200 at an early stage.

Step S201 in FIG. 9 is the processing following Step S112 which has passed via Step S105 (being not connected) in FIG. 6. At this time, as shown in FIGS. 10A to 10D, for three print jobs 1 to 3 having been received, the post processing apparatus 200 is being not connected. Accordingly, the priority of a print job which does not perform post processing, has been set to "high", and then changing of the printing order and printing have been performed based on these priorities (from S101 to S112 via S105).

In response to the notice of "a connection request" to the post processing apparatus 200 (S111), when the post processing apparatus 200 has been switched to "having been connected" (S201: YES), the priority of a print job which performs post processing, is changed to "high", and the priority of a print job which does not perform post processing, is changed to "low" (S202).

FIG. 10E is a diagram showing the respective priorities of the print jobs changed at Step S202. As shown in FIG. 10E, with regard to the print jobs 1 and 3 located in the execution queue in FIG. 10D, the priority of the print job 1 which performs post processing, is changed from "low" to "high", and the priority of the print job 3 which does not perform post processing, is changed from "high" to "low". Herein, in FIG. 10D, at a time point when the post processing apparatus 200 has been switched to "having been connected", the print jobs 1 and 3 are in a state of waiting for execution in the execution queue, and the print job 2 is in a state where printing is being executed or in a state where printing has been completed, and the print job 2 is separated from the execution queue.

In the next step S203, the processor 310 changes the execution order of the plurality of print jobs such that the print job with a high priority is executed first among the plurality of print jobs which wait for execution. In FIG. 10F, the execution order of the plurality of print jobs is changed such that the print job 1 with a high priority is executed earlier than the print job 3 with a priority lower than that of the print job 1.

Hereafter, the processing returns to Step S112 in FIG. 6, and under the control of the processor 310, the image forming apparatus 100 executes the plurality of print jobs sequentially in the execution order changed at Step S203, and performs image formation onto sheets.

In this way, in the modification example, after the post processing apparatus has become a state of having been connected to the image forming apparatus, the printing order is changed again, and a print job which performs post processing, is executed first. Accordingly, the shared post processing apparatus is released at an early stage, and it becomes to use the post processing apparatus for the other image forming apparatus, whereby the post processing apparatus can be used effectively.

(Second Embodiment)

In the first embodiment, the single post processing apparatus 200 is used. On the other hand, in the second embodiment, two post processing apparatuses 200*a* and 200*b* which can execute the respective different kinds of post processing, are used. Unless description is given specifically, the constitution of the image forming system 10 according to the second embodiment is the same as that of the image forming system according to the first embodiment. Accordingly, description for it is omitted.

Figure 11:
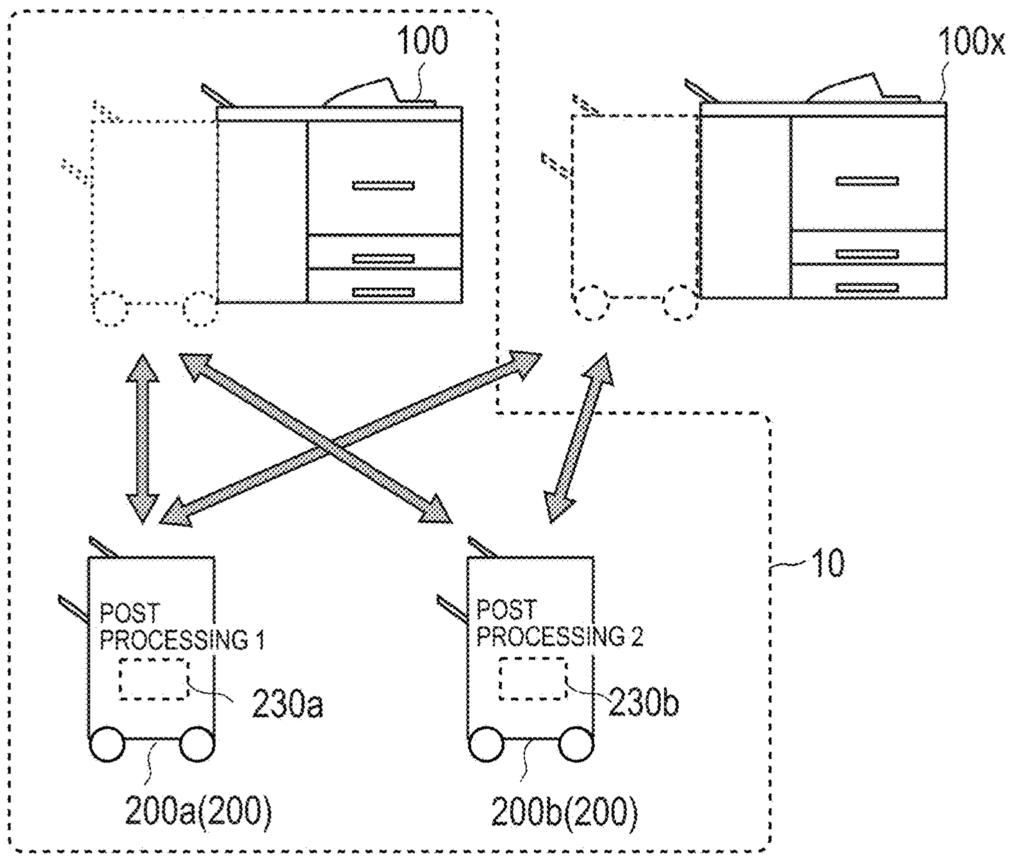
FIG. 11 is a drawing showing an entire constitution of an image forming system according to the second embodiment.

FIG. 11 is a drawing showing the entire constitution of the image forming system 10 according to the second embodiment. In the above drawing, the description for the server 300 is omitted. In the above drawing, the first post processing apparatus 200*a* includes a post processing section 230*a* which performs post processing 1, and the second post processing apparatus 200*b* includes a post processing section 230*b* which performs post processing 2 different from the post processing 1. For example, the post processing 1 is stapling processing and the post processing 2 is punching processing.

Each of the first post processing apparatus 200*a* and the second post processing apparatus 200*b* is separably connected to the image forming apparatuses 100. The other image forming apparatus 100*x* used in the same office includes a function equivalent to that of the image forming apparatus 100 according to the present embodiment. The image forming apparatus 100 and the image forming apparatus 100*x* share the first and second post processing apparatus 200*a* and 200*b*. Hereinafter, in the case of designating a specific apparatus among a plurality of apparatuses, like the post processing apparatus 200*a* and the post processing apparatus 200*b*, an alphabet to designate the specific apparatus is attached after the sign of a number. On the other hand, in the case of designating an apparatus with a comprehensive concept, like the post processing apparatus 200, an alphabet is not attached.

(Printing Control)

Figure 12:
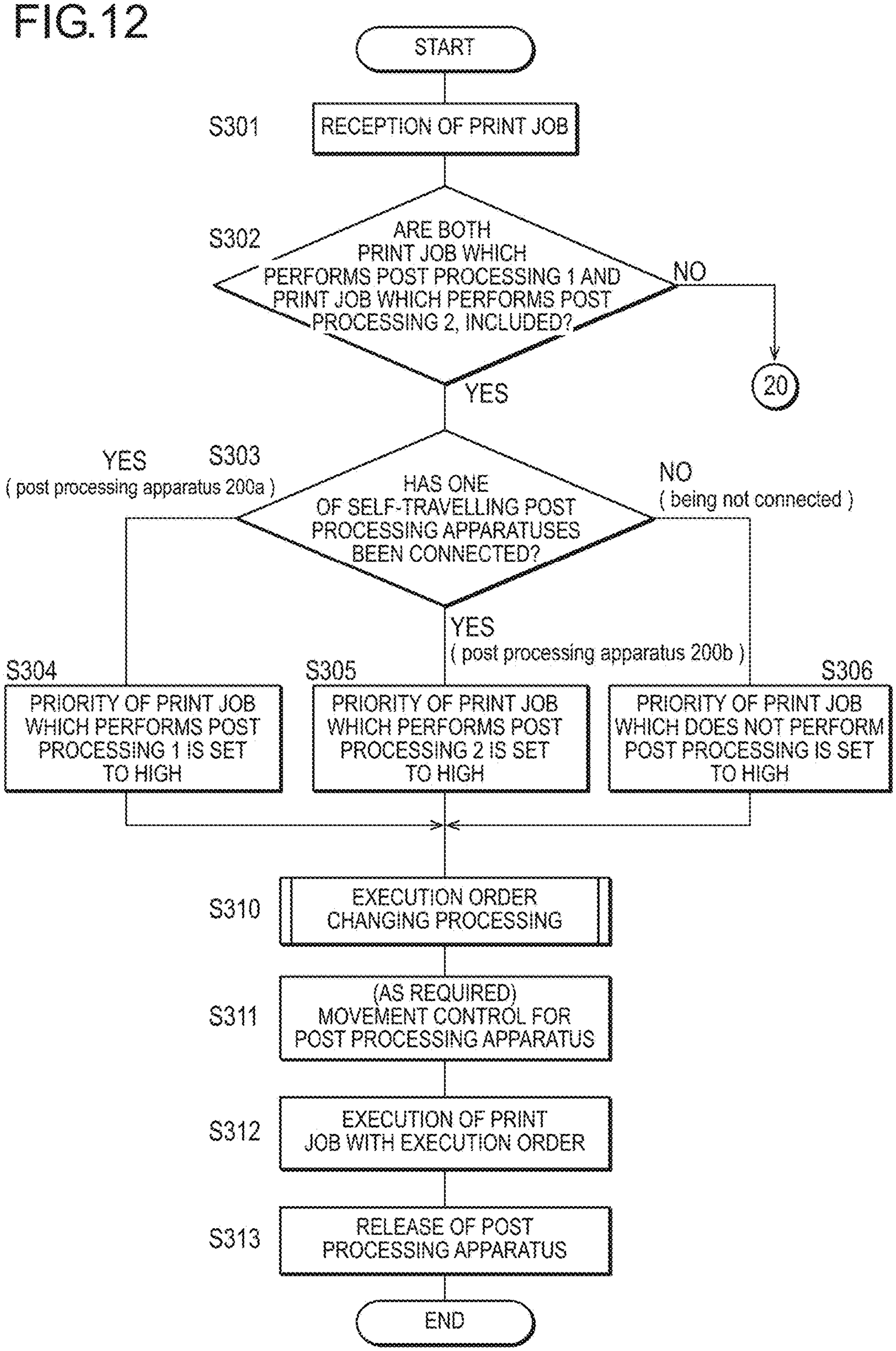
FIG. 12 is a flow chart showing printing control executed by a processor of a server according to the second embodiment.

FIG. 12 is a flowchart showing printing control mainly executed by the processor 310 of the server 300 according to the second embodiment, and FIGS. 13A, 13B, and 13C, and FIGS. 14A, 14B, and 14C are diagrams showing the changing procedures of a printing order among the plurality of print jobs.

In the case of receiving a print job execution instruction by the image forming apparatus 100 from a user through the user terminal 500 or the operation display 130 (S301), the processor 310 determines whether this print job is a plurality of print jobs including both a print job which performs post processing 1 and a print jobs which perform post processing 2 (S302).

In the case where the number of kinds of the post processing included in the plurality of print jobs is a single kind, or a print job which performs post processing is not included, namely, in the case where the plurality of received print jobs do not include both the print job which performs post processing 1 and the print job which performs post processing 2 (S302: NO), the processing proceeds to Step S102 in the flowchart shown in FIG. 6 (indicated with a sign "20").

In the case where the plurality of received print jobs include both the print job which performs post processing 1 and the print job which performs post processing 2 (S302: YES), next, the processor 310 determines whether any one of the post processing apparatuses 200*a* and 200*b* which perform two kinds of post processing included in the plurality of print jobs is "having been connected" (S303). Then, if the post processing apparatus 200*a* which performs post processing 1 is "having been connected", the processing proceeds to Step S304, if the post processing apparatus 200*b* which performs post processing 2 is "having been connected", the processing proceeds to Step S305, or if each of the post processing apparatuses 200*a* and 200*b* is "being not connected", the processing proceeds to Step S306.

(In the Case where the Post Processing Apparatus 200*a* of the Post Processing 1 is "Having been Connected" (S304))

In the case where the post processing apparatus 200*a* of the post processing 1 is "having been connected", at the following Step S304, the priority of the print job which performs post processing 1, is set to "high" among the plurality of print jobs, and the priority of each of the other print jobs is set to "low". Then, at the following Step S310, based on these set priorities, the processor 310 changes the execution order of the plurality of print jobs such that the print job with a high priority is executed first.

FIGS. 13A, 13B, and 13C show an example of print jobs in such a case. FIG. 13A shows the print jobs received at Step S301, and the plurality of these received print jobs include both the print job 2 which performs the post processing 1 and the print job 1 which performs the post processing 2. Since the post processing apparatus 200*a* is "having been connected", as shown in FIG. 13B, the priority of the print job 2 which performs the post processing 1, is set to "high", and the priority of the print job 1 which performs the post processing 2 is set to "low" lower than that of the print job 2. Then, as shown in FIG. 13C, based on the set priorities, the execution order of the plurality of print jobs is changed such that the print job 2 with a high priority is executed earlier than the print job 1 with a priority lower than that of the print job 2.

In the following Step S311, similarly to S111 in FIG. 6, if one or more post processing apparatuses 200 which perform post processing included in a print job, is or are "being not connected", the movement control is performed for the post processing apparatus 200 of "being not connected". In concrete terms, the processor 310 notifies "a connection request" with wireless communication via the access point 400 to one or both of the respective processors 210 of the two post processing apparatuses 200. The post processing apparatus which has received the notice moves towards the designated image forming apparatus 100 in response to the connection request, and then, is connected to the image forming apparatus 100 at a predetermined timing.

Hereafter, similarly to Step 112 in FIG. 6, under the control of the processor 310, the image forming apparatus 100 and the post processing apparatus 200*a* (or the post processing apparatus 200*b*) execute the plurality of print jobs sequentially in the execution order changed at Step S310, and execute image formation and post processing onto sheets (S312). After the print job which performs post processing has been completed, the image forming apparatus 100 releases the post processing apparatus 200, and has completed the processing (S313, END).

The processing which passes via Step S305 in the case where the post processing apparatus 200*b* is connected is the same as the above processing. Accordingly, description for it is omitted. The processing with regard to the connecting and releasing of the post processing apparatuses 200*a* and 200*b* at Steps S311 and S313 may be performed during the execution of Step S312 or before or after Step S312 if possible in terms of the relationship with a print job being processed.

(In the Case where Neither the Post Processing Apparatuses 200*a* Nor 200*b* is being Connected (S306))

In the case where neither the post processing apparatuses 200*a* nor 200*b* is being connected, at the following Step S306, the priority of a print job which does not perform post processing, is set to "high" among the plurality of print jobs, and the priority of each of the other print jobs is set to "low". Then, at the following Step S310, based on these set priorities, the processor 310 changes the execution order of the plurality of print jobs such that a print job with a high priority is executed first. Hereafter, the processing after the above step S311 is executed.

FIGS. 14A, 14B, and 14C show an example of print jobs in such a case. FIG. 14A shows the print jobs received at Step S301, and the plurality of these received print jobs include a print job 2 which performs a post processing 1, a print job 1 which performs a post processing 2, and a print job 3 which does not perform post processing. Since neither the post processing apparatuses 200*a* nor 200*b* is being connected, as shown in FIG. 14B, the priority of the print job 3 which does not perform post processing is set to "high", and the priority of each of the other print jobs 1 and 2 which perform the post processing is set to "low" lower than that of the print job 3. Then, as shown in FIG. 14C, based on the set priorities, the execution order of the plurality of print jobs is changed such that the print job 3 with a high priority is executed earlier than the print jobs 1 and 2 with a priority lower than that of the print job 3.

In this way, in the image forming system 10 according to the second embodiment, an effect equivalent to that in the first embodiment can be also acquired. In concrete terms, when a post processing apparatus is "being not connected", the execution of the print job which uses the post processing apparatus of "being not connected" is postponed, and other print jobs are executed first. With this, the moving processing of the post processing apparatus and the execution processing of the other print jobs can be run in parallel. As a result, the execution waiting time of a print job due to the moving of the self-traveling post processing apparatus is shortened, and the total printing time for the plurality of print jobs is shortened, whereby productivity can be increased.

(Modification Example of the Second Embodiment)

Figure 15:
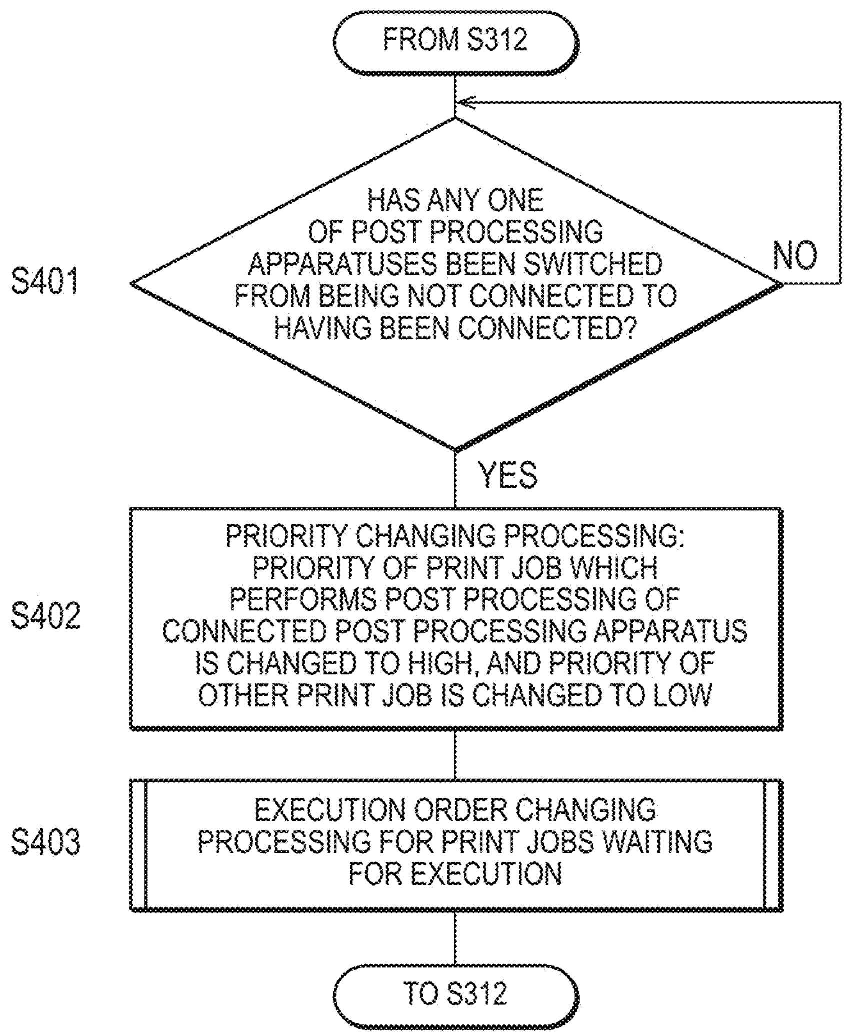
FIG. 15 is a flow chart showing printing control executed by a processor of a server according to a modification example of the second embodiment.

FIG. 15 is a flowchart showing printing control executed by the processor 310 according to the modification example of the second embodiment. The modification example shown in FIG. 15 intends to release the post processing apparatus 200 at an early stage similar to the modification example shown in FIG. 9.

Step S401 in FIG. 15 is the processing following Step 312 shown in FIG. 12. In the case where the state of the post processing apparatus 200 is switched from "being not connected" to "having been connected" (S401: YES), the following processing is performed (S402). The case of being switched to the state of "having been connected" includes mainly two cases. In the first case, from a state where none of the two post processing apparatuses are being connected, one of the two post processing apparatuses is connected (via S306). In the second case, one post processing apparatus of the two post processing apparatuses is in the state of "having been connected" from the beginning, all the print jobs which perform the post processing of the one post processing apparatus have been completed, and then, the other post processing apparatus is connected after releasing the one post processing apparatus (via S304 or S305).

In Step S402, the priority of a print job which performs the post processing of the post processing apparatus switched to "having been connected", is changed to "high", and the priority of the other print job is changed to "low". Hereafter, similarly to the processing shown in FIG. 9, the processor 310 changes the execution order of the plurality of print jobs such that a print job with a high priority is executed first among the plurality of print jobs which wait for execution, and then, the processing returns to Step S312 shown in FIG. 12, and the print jobs are executed (S403).

(Other Modification Example)

In the image forming system 10 of the present embodiment, the examples show the case where the processor 310 of the server 300 becomes a main control component and performs printing control in cooperation with the processor 110 of the image forming apparatus 100 and the processor 210 of the post processing apparatus 200. However, the present invention should not be restricted to these examples. That is, the server 300 may be omitted. For example, a part of the function of the processor 310 of the server 300 is incorporated in the processor 110 of the image forming apparatus 100. Then, this processor 110 serves as a main control component, and performs printing control of the whole image forming system 10 constituted by the image forming apparatus 100 and the post processing apparatus 200.

Further, in the second embodiment shown in FIG. 11, the image forming system 10 including two post processing apparatuses is exemplified. However, the image forming system 10 may include three or more post processing apparatuses which perform the respective different kinds of post processing. In that case, the above printing control can be performed for two post processing apparatuses selected in accordance with the contents of print jobs among the three or more post processing apparatuses. Further, the plurality of post processing apparatuses may be configured to be connected in series to each other. For example, a post processing apparatus which performs punching processing and a post processing apparatus which performs stapling processing are connected in this order at the lower stream side of the image forming apparatus 100.

Furthermore, programs which makes the server operate as an information processing apparatus may be provided by a computer readable storage medium, such as a USB memory, a flexible disk, a CD-ROM, or may be provided via on-line through networks, such as Internet. In this case, the programs stored in the computer-readable storage medium are usually transferred to a memory, a storage, etc., and are stored. Further, the programs may be provided, for example, as independent application software, or may also be incorporated in the software of each apparatus as one function of the image forming system.

In addition, the present invention is restrictively interpreted by only claims, and should not be restrictively interpreted by the constitution example of the apparatus of the present embodiment mentioned above, the assumed example, and so on.

What is claimed is:

1. An image forming system, comprising:

an image forming apparatus which includes an image forming section to perform image formation for a sheet based on print data of a print job and a communication section;

a self-travelling post processing apparatus which is separably connected to the image forming apparatus and includes a post processing section to perform post processing for a sheet conveyed from the image forming apparatus, a travelling section to move the self-travelling post processing apparatus itself, and a communication section to communicate with the image forming apparatus; and a processor configured such that when receiving a plurality of print jobs which are executed by the image forming apparatus and include both a print job which performs the post processing by the self-travelling post processing apparatus and a print job which does not perform the post processing, the processor changes an execution order of the plurality of print jobs in accordance with a geographical position and a connecting state of the self-travelling post processing apparatus to the image forming apparatus, the connecting state indicative of a mechanical connection and an electrical connection between the self-travelling post processing apparatus and the image forming apparatus.

2. The image forming system as claimed in claim 1, wherein the self-travelling post processing apparatus self-travels so as to be able to be connected to other image forming apparatus other than the image forming apparatus, and wherein when the self-travelling post processing apparatus is connected to the image forming apparatus, the processor sets a priority of a print job which performs the post processing by the post processing apparatus, to higher than a priority of a print job which does not perform the post processing, and the processor changes an execution order of the plurality of print jobs such that the print job with the higher priority is executed first.

3. The image forming system as claimed in claim 1, wherein when the self-travelling post processing apparatus is not connected to the image forming apparatus, the processor sets a priority of a print job which does not perform the post processing by the self-travelling post processing apparatus, to higher than a priority of a print job which performs the post processing, and the processor changes an execution order of the plurality of print jobs such that the print job with the higher priority is executed first.

4. The image forming system as claimed in claim 3, wherein when the self-travelling post processing apparatus is switched from a state of being not connected to the image forming apparatus to a state of having been connected to the image forming apparatus, the processor changes the setting such that the priority of the print job which performs the post processing by the self-travelling post processing apparatus, becomes higher than the priority of the print job which does not perform the post processing, and the processor determines an execution order of the plurality of print jobs based on the changed priorities.

5. An image forming apparatus capable of being connected to a self-travelling post processing apparatus which performs post processing for a sheet, comprising:

a processor; and a memory comprising instructions that, upon execution by the processor, cause the image forming apparatus to at least:

perform image formation for a sheet based on print data of a print job;

communicate print job information with the self-travelling post processing apparatus; and when receiving a plurality of print jobs including both a print job which performs the post processing by the self-travelling post processing apparatus and a print job which does not perform the post processing by the self-travelling post processing apparatus, change an execution order of the plurality of print jobs in accordance with a geographical position and a connecting state of the self-travelling post processing apparatus, the connecting state indicative of a mechanical connection and an electrical connection between the self-travelling post processing apparatus and the image forming apparatus.

6. The image forming apparatus as claimed in claim 5, wherein the self-travelling post processing apparatus self-travels so as to be able to be connected to other image forming apparatus other than the image forming apparatus, and wherein when the self-travelling post processing apparatus is connected to the image forming apparatus, the processor sets a priority of a print job which performs the post processing by the self-travelling post processing apparatus, to higher than a priority of a print job which does not perform the post processing, and the processor changes an execution order of the plurality of print jobs such that the print job with the higher priority is executed first.

7. The image forming apparatus as claimed in claim 5, wherein when the self-travelling post processing apparatus is not connected to the image forming apparatus, the processor sets a priority of a print job which does not perform the post processing by the self-travelling post processing apparatus, to higher than a priority of a print job which performs the post processing, and the processor changes an execution order of the plurality of print jobs such that the print job with the higher priority is executed first.

8. A non-transitory computer-readable storage medium storing a program for causing an information processing apparatus to execute a processing method of controlling an image forming apparatus to perform image formation for a sheet based on print data of a print job and a self-travelling post processing apparatus which performs post processing for a sheet subjected to image formation and is separably connected to the image forming apparatus, the processing method comprising steps of:

receiving a plurality of print jobs; and changing an execution order of the plurality of print jobs in accordance with a geographical position and a connecting state of the self-travelling post processing apparatus to the image forming apparatus when the plurality of print jobs include both a print job which performs the post processing by the self-travelling post processing apparatus and a print job which does not perform the post processing, wherein the connecting state is indicative of a mechanical connection and an electrical connection between the post processing apparatus and the image forming apparatus.

9. The non-transitory computer-readable storage medium as claimed in claim 8, wherein the self-travelling post processing apparatus self-travels by a travelling section so as to be able to be connected to other image forming apparatus other than the image forming apparatus, and wherein in the changing step, when the post processing apparatus is connected to the image forming apparatus, a priority of a print job which performs the post processing by the self-travelling post processing apparatus, is set to higher than a priority of a print job which does not perform the post processing, and an execution order of the plurality of print jobs is changed such that the print job with the higher priority is executed first.

10. The non-transitory computer-readable storage medium as claimed in claim 9, wherein in the changing step, when the self-travelling post processing apparatus is not connected to the image forming apparatus, a priority of a print job which does not perform the post processing by the self-travelling post processing apparatus, is set to higher than a priority of a print job which performs the post processing, and an execution order of the plurality of print jobs is changed such that the print job with the higher priority is executed first.

11. The non-transitory computer-readable storage medium as claimed in claim 10, wherein in the changing step, when the self-travelling post processing apparatus is switched from a state of being not connected to the image forming apparatus to a state of having been connected to the image forming apparatus, the setting is changed such that a priority of a print job which performs the post processing by the self-travelling post processing apparatus, becomes higher than a priority of a print job which does not perform the post processing, and an execution order of the plurality of print jobs is determined based on the changed priorities.

* * * * *